United States Patent
Takemoto et al.

(10) Patent No.: US 6,525,171 B2
(45) Date of Patent: Feb. 25, 2003

(54) PROCESS FOR PRODUCING A POLYCARBONATE AND METHOD OF CLEANING A PRODUCTION UNIT

(75) Inventors: Hidemi Takemoto, Iwakuni (JP); Toru Sawaki, Iwakuni (JP); Katsushi Sasaki, Iwakuni (JP); Keiichi Kaneko, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/969,582

(22) Filed: Oct. 4, 2001

(65) Prior Publication Data

US 2002/0052467 A1 May 2, 2002

(51) Int. Cl.[7] .................................................. C08F 6/00
(52) U.S. Cl. ....................................... 528/480; 528/481
(58) Field of Search ................................. 528/480, 481

(56) References Cited

U.S. PATENT DOCUMENTS 4,383,902 A    5/1983    Frank et al.

FOREIGN PATENT DOCUMENTS

| EP | 0 688 807 A1 | 12/1995 |
| EP | 0 819 717 A1 | 1/1998 |
| EP | 1 120 435 A1 | 8/2001 |
| JP | 04-007328 A | 1/1992 |
| JP | 04-007329 A | 1/1992 |
| JP | 04-088017 A | 3/1992 |
| JP | 06-056984 A | 3/1994 |
| JP | 06-200008 A | 7/1994 |
| JP | 07-268091 A | 10/1995 |
| JP | 09-025340 A | 1/1997 |
| JP | 09-124786 A | 5/1997 |

OTHER PUBLICATIONS

Patent Abstract of Japan, JP–A–04–088017, date Mar. 19, 1992.
Patent Abstract of Japan, JP–A–007328, date Jan. 10, 1992.
Patent Abstract of Japan, JP–A–007329, date Jan. 10, 1992.
Patent Abstract of Japan, JP–A–06–056984, date Mar. 1, 1994.
Patent Abstract of Japan, JP–A–06–200008, date Jul. 19, 1994.
Patent Abstract of Japan, JP–A–09–025340, date Jan. 28, 1997.
Patent Abstract of Japan, JP–A–09–124786, date May 13, 1997.
Patent Abstract of Japan, JP–A–07–268091, date Oct. 17, 1995.

*Primary Examiner*—Terressa M. Boykin
(74) *Attorney, Agent, or Firm*—Sughrue Mion, PLLC

(57) ABSTRACT

A method of cleaning the aromatic polycarbonate production unit with a carbonic acid diaryl ester at a temperature of 200 to 350° C. in an inert gas atmosphere.

24 Claims, No Drawings

PROCESS FOR PRODUCING A POLYCARBONATE AND METHOD OF CLEANING A PRODUCTION UNIT

FIELD OF THE INVENTION

The present invention relates to a process for producing a polycarbonate and a method of cleaning a production unit. More specifically, it relates to a process for producing a polycarbonate having excellent color and a method of cleaning a production unit for producing the above polycarbonate.

DESCRIPTION OF THE PRIOR ART

A polycarbonate resin obtained by interfacial polycondensation between bisphenol A and phosgene is widely used for various purposes, for example, electric and electronic parts, optical parts and auto parts thanks to its excellent mechanical properties and thermal properties. However, it involves a safety problem because phosgene which is toxic is used and also an environmental preservation problem because methylene chloride is used as a solvent. In addition, a chlorine component derived from methylene chloride and sodium chloride which is a by-product corrodes metallic material during the molding of a part because it remains in the polycarbonate. Then, a polycarbonate produced by an ester exchange method which eliminates use of methylene chloride and phosgene has recently been attracting much attention and polycarbonate products produced by melt polymerization have appeared on the market. However, since the polycarbonate obtained by the ester exchange method receives long-time heat history at a high temperature, it is inferior in color and therefore it is difficult to obtain a high-quality polycarbonate. Particularly, in a polycarbonate recently applied to optical uses such as DVD, DVD-RAM, MO, CD-R and CD-RW which are required to have high density and high accuracy, discoloration caused by low thermal stability and gelation caused by thermal deformation have a direct influence upon the optical properties such as block error rate and the mechanical properties such as tensile properties, flexural properties and toughness of the final product. Therefore, further improvement of color and thermal stability of the polycarbonate produced by the ester exchange method has been desired.

To suppress such discoloration, it is already known that use of an inert material as the material of a reactor is effective and there are proposed a method making use of nickel, tantalum, chromium or alloy thereof (U.S. Pat. No. 4,383,902) and a method making use of a material having an iron content of 20 wt % or less (JP-A 4-88017) (the term "JP-A" as used herein means an "unexamined published Japanese patent application"). However, reaction systems made of these materials are more expensive than reaction systems made of stainless steel and lined with glass which are used for interfacial polycondensation. The development of a reaction system which is made of an inexpensive material has been desired to prevent an increase in the cost of a polycarbonate.

One of the reaction systems made of inexpensive materials is a reaction system made of stainless steel. When a polycarbonate is produced by an ester exchange reaction using this reaction system, there arise such problems that the obtained polycarbonate is discolored, a high molecular weight polycarbonate is hardly produced and productivity is low.

To solve the above problems, a method for smoothing the surface by buffing (JP-A 4-7328) and a method for carrying out acid cleaning to remove scales on the surface and for immobilization (JP-A 4-7329) have been tried. However, with these methods, satisfactory results could not be obtained.

When production is started with a new system or when production is resumed after it is suspended, a considerably discolored polycarbonate is obtained for a long time in most cases and thus the production of articles below standards is unavoidable for a long time.

Further when a production unit is continuously used for a long time, the quality of the obtained polycarbonate deteriorates. Therefore, the production unit must be stopped, disassembled and serviced occasionally to maintain the quality. Accordingly, as the operation rate of the production unit is low and costs required for the disassembly and servicing of the system are high, there has been desired the development of an effective method of cleaning a production unit, which eliminates the need of disassembly and servicing without reducing the operation rate.

JP-A 6-56984 discloses a process for producing an aromatic polycarbonate by reacting an aromatic dihydroxy compound with a diaryl carbonate in a stainless steel reactor which has been cleaned with a solution containing an aromatic hydroxy compound.

JP-A 6-200008 discloses a process for producing a polycarbonate by reacting a carbonic acid diester with a dihydroxyaryl compound in a reactor whose reaction mixture contacting portion has been cleaned with a phenolic compound.

JP-A 9-25340 discloses a process for producing a polycarbonate through an ester exchange reaction in a reactor at least the liquid contacting portion of which has been cleaned with a carbonyl group-containing compound.

JP-A 9-124786 discloses a process for producing a polycarbonate from an aromatic dihydroxy compound and a carbonic acid diester compound in a reactor at least the liquid contacting portion of which has been cleaned with a cleaning fluid comprising a compound represented by the following formula in accordance with a melt ester exchange method:

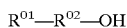

wherein $R^{01}$ is an alkyl group, aryl group or hydrogen atom and $R^{02}$ is an alkylene group or alkenylene group.

However, as the reaction system is not always cleaned thoroughly in the above methods, it is difficult to continuously produce a polycarbonate having excellent color for a long time.

SUMMARY OF THE INVENTION

It is therefore an object of the present invention to provide a method of cleaning a production unit for producing an aromatic polycarbonate having excellent color by an ester exchange method.

It is another object of the present invention to provide a method of cleaning an aromatic polycarbonate production unit, which enables the continuous production of an aromatic polycarbonate having excellent color for a long time when production is started with a new production unit or when production is resumed after suspension.

It is still another object of the present invention to provide a method of cleaning an aromatic polycarbonate production unit, which is capable of cleaning an aromatic polycarbonate production unit thoroughly, for example, by removing the residual polymer after the end of cleaning.

It is a further object of the present invention to provide a process for producing an aromatic polycarbonate by an ester exchange method with a production unit cleaned by the above cleaning method of the present invention.

Other objects and advantages of the present invention will become apparent from the following description.

According to the present invention, firstly, the above objects and advantages of the present invention are attained by a method of cleaning an aromatic polycarbonate production unit, comprising cleaning the aromatic polycarbonate production unit with a carbonic acid diaryl ester at a temperature of 200 to 350° C. in an inert gas atmosphere.

According to the present invention, secondly, the above objects and advantages of the present invention are attained by a method of cleaning an aromatic polycarbonate production unit, comprising:
(1) depolymerizing an aromatic polycarbonate remaining in the production unit with a carbonate group-containing compound in the production unit to form a depolymerized product having a viscosity average molecular weight of 8,000 or less;
(2) discharging the depolymerized product from the production unit;
(3) introducing a carbonic acid diaryl ester into the production unit; and
(4) cleaning the inside of the production unit with the carbonic acid diaryl ester at a temperature of 200 to 350° C. in an inert gas atmosphere.

According to the present invention, thirdly, the above objects and advantages of the present invention are attained by a process for producing an aromatic polycarbonate, comprising carrying out an ester exchange reaction between an aromatic dihydroxy compound and a carbonic acid diester in the presence of a catalyst consisting of a combination of a nitrogen-containing basic compound and at least one compound selected from the group consisting of an alkali metal compound and an alkaline earth metal compound in a production unit cleaned by the above cleaning method of the present invention.

DETAILED DESCRIPTION OF THE PREFERRED EMBODIMENTS

The material of the aromatic polycarbonate production unit to be cleaned in the present invention is, for example, stainless steel, non-ferrous material such as tantalum, chromium or nickel, or non-stainless material such as Monel, inconel or Hastelloy. Out of these, stainless steel is preferred because it is inexpensive. The material may be used in the liquid contacting portion of a reactor and does not have to be used in the entire reactor.

The above stainless steel is preferably a steel material containing 10 to 30 wt % of chromium. Examples of such stainless steel include SUS304, SUS304L, SUS309, SUS310, SUS316 and SUS316L.

The portion to be cleaned may be subjected to mechanical polishing such as buffing, polishing treatment such as electropolishing, or chemical treatment with an acid, alkali or a combination thereof before cleaning.

The production unit maybe, for example, a vertical mixer which is suitably used to produce an aromatic polycarbonate in a batch manner, or a horizontal mixer or extruder which is suitably used to produce an aromatic polycarbonate in a continuous manner.

The carbonic acid diaryl ester used for the cleaning of the production unit is not particularly limited and various compounds may be used. Examples of the carbonic acid diaryl ester include diphenyl carbonate, ditolyl carbonate, bis(chlorophenyl)carbonate, m-cresyl carbonate, dinaphthyl carbonate, bis(diphenyl)carbonate and bisphenol A bisphenyl carbonate. Out of these, diphenyl carbonate is particularly preferred.

The carbonic acid diaryl ester is preferably used in an amount of 10% or more of the effective inner volume of the production unit and less than the amount of a retained aromatic polycarbonate at the time of producing an aromatic polycarbonate.

The cleaning temperature is in the range of 200 to 350° C., preferably 200 to 330° C. At a temperature below 200° C., it is difficult to clean the production unit thoroughly and at a temperature above 350° C., the improvement of a cleaning effect by a temperature rise is not observed.

The cleaning atmosphere is an inert gas. Cleaning becomes difficult when the aromatic polycarbonate is oxidized during cleaning. The inert gas is a non-oxidizing gas such as nitrogen or argon. Out of these, nitrogen gas is preferred.

Cleaning may be carried out under agitation or while an inert gas is blown into the carbonic acid diaryl ester. Further, the inert atmosphere may be under normal pressure, increased pressure or reduced pressure. The cleaning time is 0.25 to 12 hours, preferably 1 to 8 hours, more preferably 3 to 5 hours.

The reason why an aromatic polycarbonate having excellent color is produced by using a production unit cleaned with a carbonic acid diaryl ester as described above is that an active substance which worsens the color of an aromatic polycarbonate and is assumed to be existent on the surface in contact with the aromatic polycarbonate of a reactor, particularly the surface of stainless steel in a state that it is chemically bonded and cannot be removed physically is inactivated by the carbonic acid diaryl ester.

As described above, after cleaning with the carbonic acid diaryl ester, the cleaning fluid is discharged from the reactor.

After discharge, the reactor is preferably vacuum dried or cleaned with an aromatic monohydroxy compound again before it is used for the production of an aromatic polycarbonate.

Vacuum drying may be carried out at a pressure of 100 Torr or less, preferably 100 to 0.5 Torr for 1 to 12 hours.

The aromatic monohydroxy compound used for cleaning is not particularly limited and various compounds may be used, as exemplified by phenol, o-cresol, m-cresol, p-cresol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol 2,5-di-t-butylphenol, 2,4-di-t-butylphenol, 3,5-di-t-butylphenol, 2,5-dicumylphenol and 3,5-dicumylphenol.

The aromatic monohydroxy compound is used in an amount of 10% or more of the effective inner volume of the production unit and less than the amount of a retained aromatic polycarbonate at the time of producing an aromatic polycarbonate.

It should be understood that operation conditions such as cleaning temperature, atmosphere and time for cleaning with the aromatic monohydroxy compound are the same as those named for cleaning with the carbonic acid diaryl ester.

According to the present invention, as described above, there is further provided a method of cleaning an aromatic polycarbonate production unit, which comprises:
(1) depolymerizing an aromatic polycarbonate remaining in the production unit with a carbonate group-containing compound in the production unit to form a depolymerized product having a viscosity average molecular weight of 8,000 or less;
(2) discharging the depolymerized product from the production unit;
(3) introducing a carbonic acid diaryl ester into the production unit; and
(4) cleaning the inside of the production unit with the carbonic acid diaryl ester at a temperature of 200 to 350° C. in an inert gas atmosphere.

A description is subsequently given of this method.

The step (1) is to depolymerize an aromatic polycarbonate remaining in the production unit, for example, an aromatic polycarbonate having a viscosity average molecular weight of 10,000 or more, until the viscosity average molecular weight becomes 8,000 or less.

Examples of the production unit are the same as those listed above.

The carbonate group-containing compound used in the step (1) is not particularly limited but various compounds may be used, as exemplified by polycarbonate oligomers having a viscosity average molecular weight of 8,000 or less, diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate, dibutyl carbonate and dicyclohexyl carbonate. Out of these, polycarbonate oligomers and diphenyl carbonate are particularly preferred.

The carbonate group-containing compound is preferably identical to a carbonic acid diester used for the production of an aromatic polycarbonate remaining in the production unit or to an aromatic oligocarbonate having a viscosity average molecular weight of 8,000 or less which is formed in the course of the production of an aromatic polycarbonate.

The carbonate group-containing compound is used in an amount of preferably 1 part or more by weight, more preferably 5 to 30 parts by weight based on 100 parts by weight of the aromatic polycarbonate remaining in the reactor.

The step (1) is preferably carried out at 200° C. or more. At a temperature below 200° C., the depolymerization of the aromatic polycarbonate hardly takes place.

In the subsequent step (2), an aromatic polycarbonate having a reduced viscosity average molecular weight of 8,000 or less is discharged from the production unit. The depolymerized product is preferably discharged until the amount thereof becomes preferably 10% or less, more preferably 5% or less of the volume of the production unit.

A reduction in the viscosity average molecular weight to 8,000 or less makes it easy to discharge the depolymerized product from the production unit until the above residue is attained.

When the carbonic acid diaryl ester is introduced into the production unit in the subsequent step (3) while the depolymerized product remains in the production unit in an amount of 10% or more of the volume of the production unit and further cleaning is carried out by using the carbonic acid diaryl ester in the following step (4), the cleaning effect tends to become unsatisfactory disadvantageously.

In the step (4), the inside of the production unit is cleaned with the carbonic acid diaryl ester at a temperature of 200 to 350° C. in an inert gas atmosphere. This step (4) is the above cleaning method of the present invention.

Therefore, as for what is not described herein, it should be understood that the above descriptions of the cleaning method of the present invention and the subsequent operation are directly applied.

The carbonic acid diaryl ester in the step (4) is preferably used in an amount of 10% to 90% of the effective inner volume of the production unit. For cleaning with an aromatic monohydroxy compound which may be carried out after that, the aromatic monohydroxy compound is used in an amount of 10% to 90% of the effective inner volume of the production unit.

A description is subsequently given of a process for producing an aromatic polycarbonate using a production unit cleaned by the above cleaning method.

When the production of an aromatic polycarbonate is suspended and a reactor is used to produce an aromatic polycarbonate without cleaning after suspension, it takes several days to obtain an aromatic polycarbonate having excellent color. However, when a production unit cleaned by the cleaning method of the present invention is used, an aromatic polycarbonate having excellent color can be obtained in an extremely short period of time after the resumption of the production of an aromatic polycarbonate. It has been revealed that particularly after cleaning, for example, even when the production unit is left for 1 day or more and then production is resumed, an aromatic polycarbonate having excellent color can be produced without a problem.

Also, an aromatic polycarbonate having excellent color can be obtained in a short period of time whether production is carried out with a batch system or continuous system when a production unit cleaned by the cleaning method of the present invention is used. Production is preferably carried out with a continuous system from the viewpoint of production efficiency. It has been found that an aromatic polycarbonate which has reached a steady state assumes more excellent color.

The process for producing an aromatic polycarbonate of the present invention comprises carrying out an ester exchange reaction between an aromatic dihydroxy compound and a carbonic acid diester in the presence of a catalyst consisting of a combination of a nitrogen-containing basic compound and at least one compound selected from the group consisting of an alkali metal compound and an alkaline earth metal compound in a production unit cleaned by the cleaning method of the present invention as described above.

The aromatic dihydroxy compound is preferably an aromatic dihydroxy compound having 6 to 25 carbon atoms. Examples of the aromatic dihydroxy compound include bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxydiphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide and bis(4-hydroxyphenyl)sulfoxide. Out of these, 2,2-bis(4-hydroxyphenyl)propane (may be called "bisphenol A" hereinafter) is preferred.

The carbonic acid diester is preferably a carbonic acid diester having 3 to 20 carbon atoms. Specific examples of the carbonic acid diester include diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate, dibutyl carbonate and dicyclohexyl carbonate. Out of these, diphenyl carbonate (may be abbreviated as "DPC" hereinafter) is preferred.

To produce an aromatic polycarbonate, the carbonic acid diester is used in an amount of preferably 1.00 to 1.20 mols, more preferably 1.005 to 1.10 mols, much more preferably 1.01 to 1.05 mols based on 1 mol of the aromatic dihydroxy compound.

Further, to produce an aromatic polycarbonate, an aliphatic diol such as a ethylene glycol, 1,4-butanediol, 1,4-cyclohexanedimethanol or 1, 10-decanediol; dicarboxylic acid such as succinic acid, isophthalic acid, 2,6-naphthalenedicarboxylic acid, adipic acid, cyclohexanecarboxylic acid or terephthalic acid; or oxyacid such as lactic acid, p-hydroxybenzoic acid or 6-hydroxy-2-naphthoic acid may be used in combination as required.

The alkali metal compound used as a catalyst is, for example, a hydroxide, bicarbonate, carbonate, acetate, nitrate, nitrite, sulfite, cyanate, thiocyanate, stearate, borohydride, benzoate, hydrogenphosphate, bisphenol or phenol salt of an alkali metal.

Specific examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, sodium benzoate, potassium benzoate, lithium benzoate, disodium hydrogenphosphate, dipotassium hydrogenphosphate, dilithium hydrogenphosphat; disodium salts, dipotassium salts and dilithium salts of bisphenol A, and sodium salts, potassium salts and lithium salts of phenol. Out of these, sodium salts of aromatic dihydroxy compounds such as disodium salts of bisphenol A and sodium salts of aromatic monohydroxy compounds such as sodium salts of phenol are particularly preferred.

The alkaline earth metal compound used as a catalyst is, for example, a hydroxide, bicarbonate, carbonate, acetate, nitrate, nitrite, sulfite, cyanate, thiocyanate, stearate, benzoate, bisphenol or phenol salt of an alkaline earth metal.

Specific examples of the alkaline earth metal compound include calcium hydroxide, barium hydroxide, strontium hydroxide, calcium bicarbonate, barium bicarbonate, strontium bicarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salts, barium salts and strontium salts of bisphenol A, and calcium salts, barium salts and strontium salts of phenol.

The alkali metal compound and/or alkaline earth metal compound as a catalyst is preferably used in an amount of $1 \times 10^{-8}$ to $1 \times 10^{-3}$ equivalent in terms of the alkali metal element and/or alkaline earth metal element contained in the catalyst based on 1 mol of the aromatic dihydroxy compound. The amount is more preferably $1 \times 10^{-8}$ to $5 \times 10^{-6}$ equivalent, much more preferably $1 \times 10^{-7}$ to $5 \times 10^{-6}$ equivalent based on the same standard. When the amount of the alkali metal compound and/or alkaline earth metal compound is outside the above range, it may exert a bad influence upon the physical properties of the obtained polycarbonate or an ester exchange reaction does not proceed fully, thereby making it impossible to obtain a polycarbonate having a high molecular weight. Even when the nitrogen-containing basic compound contained in the aromatic polycarbonate prepolymer is adjusted to a specific value to be described hereinafter, the color and thermal stability of the obtained aromatic polycarbonate are hardly improved.

Examples of the nitrogen-containing basic compound include ammonium hydroxides having an alkyl, aryl or alkylaryl group such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi-CH_2(Me)_3NOH$) and hexadecyltrimethylammonium hydroxide; tertiary amines such as triethylamine, tributylamine, dimethylbenzylamine and hexadecyldimethylamine; and basic salts such as tetramethylammonium borohydride ($Me_4NBH_4$), tetrabutylammonium borohydride ($Bu_4NBH_4$), tetramethylammonium tetraphenylborate ($Me_4NBPh_4$) and tetrabutylammonium tetraphenylborate ($Bu_4NBPh_4$). Out of these, tetramethylammonium hydroxide ($Me_4NOH$) is the most preferred.

The above nitrogen-containing basic compound is preferably used in an amount of $1 \times 10^{-5}$ to $5 \times 10^{-3}$ equivalent in terms of the ammonia nitrogen atom contained in the nitrogen-containing basic compound based on 1 mol of the aromatic dihydroxy compound. The amount is more preferably $2 \times 10^{-5}$ to $5 \times 10^{-4}$ equivalent, particularly preferably $5 \times 10^{-5}$ to $5 \times 10^{-4}$ equivalent based on the same standard.

In the present description, the ratio of the alkali metal compound, alkaline earth metal compound and nitrogen-containing basic compound to the charged aromatic dihydroxy compound is expressed by "W (numerical value) equivalent of Z (name of the compound) in terms of metal or basic nitrogen based on 1 mol of the aromatic dihydroxy compound". It means that the amount of Z corresponds to W mol when Z has one sodium atom as in the case of sodium phenoxide or 2,2-bis(4-hydroxyphenyl)propane monosodium salt or has one basic nitrogen atom as in the case of triethylamine and to W/2 mol when Z has two sodium atoms as in the case of 2,2-bis(4-hydroxyphenyl)propane disodium salt.

In the present invention, (a) an alkali metal salt of an ate complex of a group XIV element of the periodic table or (b) an alkali metal salt of an oxoacid of a group XIV element of the periodic table may be optionally used as the alkali metal compound of the catalyst. The group XIV element of the periodic table is silicon, germanium or tin.

By using the alkali metal compounds as a polycondensation reaction catalyst, a polycondensation reaction can proceed quickly and completely. Also, they can suppress an undesirable side reaction such as a branching reaction which occurs during a polycondensation reaction to a low level.

Examples of the alkali metal salt of the ate complex of the group XIV element of the periodic table (a) are enumerated in JP-A 7-268091. Specifically, germanium (Ge) compounds include $NaGe(OMe)5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$.

Tin (Sn) compounds include NaSn(OMe)$_3$, NaSn(OMe)$_2$(OEt), NaSn(OPr)$_3$, NaSn(O-n-C$_6$H$_{13}$)$_3$, NaSn(OMe)$_5$, NaSn(OEt)$_5$, NaSn(OBu)$_5$, NaSn(O-n-C$_{12}$H$_{25}$)$_5$, NaSn(OEt)$_3$, NaSn(OPh)$_5$ and NaSnBu$_2$(OMe)$_3$.

Preferred examples of the alkali metal salt of the oxoacid of the group XIV element of the periodic table (b) include alkali metal salts of silicic acid, stannic acid, germanium(II) acid (germanous acid) and germanium(IV) acid (germanic acid).

The alkali metal salt of silicic acid is, for example, an acidic or neutral alkali metal salt of monosilicic acid or a condensate thereof, as exemplified by monosodium orthosilicate, disodium orthosilicate, trisodium orthosilicate and tetrasodium orthosilicate.

The alkali metal salt of stannic acid is, for example, an acidic or neutral alkali metal salt of monostannic acid or a condensate thereof, as exemplified by disodium monostannate (Na$_2$SnO$_3$.xH$_2$O, x=0 to 5) and tetrasodium monostannate (Na$_4$SnO$_4$).

The alkali metal salt of germanium(II) acid (germanous acid) is, for example, an acidic or neutral alkali metal salt of monogermanous acid or a condensate thereof, as exemplified by monosodium germanate (NaHGeO$_2$).

The alkali metal salt of germanium(IV) acid (germanic acid) is, for example, an acidic or neutral alkali metal salt of monogermanium(IV) acid or a condensate thereof, as exemplified by monolithium orthogermanate (LiH$_3$GeO$_4$), disodium orthogermanate, tetrasodium orthogermanate, disodium digermanate (Na$_2$Ge$_2$O$_5$), disodium tetragermanate (Na$_2$Ge$_4$O$_9$) and disodium pentagermanate (Na$_2$Ge$_5$O$_{11}$).

The above polycondensation reaction catalyst is preferably used in an amount of $1\times10^{-8}$ to $1\times10^{-3}$ equivalent in terms of the alkali metal element contained in the catalyst based on 1 mol of the aromatic dihydroxy compound. The amount is more preferably $1\times10^{-8}$ to $5\times10^{-6}$ equivalent, much more preferably $1\times10^{-7}$ to $5\times10^{-6}$ equivalent based on the same standard.

At least one cocatalyst selected from the group consisting of an oxoacid of a group XIV element of the periodic table and an oxide of the same element may be used as required in combination with the above catalyst in the polycondensation reaction of the present invention.

Undesirable side reactions such as a branching reaction liable to occur during a polycondensation reaction and the generation of foreign matter or burn mark in a molding apparatus during molding can be more effectively suppressed without ill-affecting the terminal blocking reaction and polycondensation reaction rate by using the cocatalyst in a specific ratio.

Examples of the oxoacid of the group XIV element of the periodic table include silicic acid, stannic acid and germanic acid.

Examples of the oxide of the group XIV element of the periodic table include silicon monoxide, silicon dioxide, tin monoxide, tin dioxide, germanium monoxide, germanium dioxide and condensates thereof.

The cocatalyst is preferably used in an amount of 50 mols (atoms) or less in terms of the group XIV metal element of the periodic table contained in the cocatalyst based on 1 mol (atom) of the alkali metal element contained in the polycondensation reaction catalyst. When the cocatalyst is used in an amount of more than 50 mols (atoms) in terms of the metal element, the polycondensation reaction rate slows down disadvantageously.

The cocatalyst is more preferably used in an amount of 0.1 to 30 mols (atoms) in terms of the group XIV metal element of the periodic table contained in the cocatalyst based on 1 mol (atom) of the alkali metal element contained in the polycondensation reaction catalyst.

These catalytic systems have an advantage that a polycondensation reaction and a terminal blocking reaction can proceed quickly and completely when they are used in the polycondensation reaction. Also, they can suppress an undesirable side reaction such as a branching reaction which occurs in a polycondensation reaction system to a low level.

For the production of an aromatic polycarbonate through an ester exchange reaction between an aromatic dihydroxy compound and a carbonic acid diester under heating and melting, the aromatic dihydroxy compound and the carbonic acid diester are heated and stirred in an inert gas atmosphere, and the above catalyst is added to the obtained molten mixture to start an ester exchange reaction.

The reaction temperature is generally 140 to 300° C. and preferably increased along with the proceeding of polymerization. The pressure of the reaction system is reduced or a large amount of an inert gas is circulated to enable the formed monohydoroxy compound to be easily distilled out so as to promote the reaction.

The production unit used to carry out the present invention is not limited to a particular type and a generally known vertical mixer, horizontal mixer, extruder and the like may be used. A production unit which is cleaned for 1 hour or more is preferably used irrespective of the type thereof.

When the reaction is carried out in a batch manner, two vertical mixers are used. Preferably, an aromatic dihydroxy compound and a carbonic acid diester are charged into the first mixer equipped with a fractionating column in the above molar ratio, the inside of the mixer is substituted with an inert gas, the above raw materials are heated to be molten, the above polymerization catalyst is added in a predetermined amount and heated while the system is placed under vacuum to carry out the initial stage of polymerization, the reaction solution is transferred to the second mixer having no fractionating column, and the pressure and temperature of the system are further raised to continue polymerization until a predetermined degree of polymerization is achieved.

In order to maintain the concentration of the nitrogen-containing basic compound in the reaction system at the range of the present invention, an appropriate amount of the nitrogen-containing basic compound is added during the reaction in the first mixer or during the transfer of the reaction solution to the second mixer to continue the reaction.

When the reaction is carried out in a continuous manner, a plurality of mixers are used. Preferably, a vertical mixer equipped with a fractionating column is used as the first tank in which the reaction product has a low melt viscosity, a horizontal mixer or double-screw extruder is used as subsequent polymerizers in which the melt viscosity of the reaction product increases and the removal of the by-produced aromatic monohydroxy compound becomes difficult, these polymerizers are arranged in series, the molten raw materials and catalyst are continuously supplied into the first tank, and an aromatic polycarbonate having a predetermined degree of polymerization is continuously extracted from the last polymerizer. At this stage, in order to maintain the concentration of the nitrogen-containing basic compound in the reaction system at the range of the present invention, an appropriate amount of the nitrogen-containing basic compound is added to the first mixer and other polymerizers to continue the reaction.

A stabilizer may be added to the aromatic polycarbonate obtained in the present invention. Conventionally known stabilizers may be effectively used as the stabilizer. Out of these, ammonium salts and phosphonium salts of sulfonic acid are more preferred, and ammonium salts and phosphonium salts of dodecylbenzenesulfonic acid such as tetrabutylphosphonium dodecylbenzenesulfonate and ammonium salts and phosphonium salts of paratoluenesulfonic acid such as tetrabutylammonium paratoluenesulfonate are much more preferred. Sulfonic acid esters such as methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are also preferably used. Out of these, tetrabutylphosphonium dodecylbenzenesulfonate is the most preferred.

The amount of the stabilizer is preferably 0.5 to 50 mols, more preferably 0.5 to 10 mols, much more preferably 0.8 to 5 mols based on 1 mol of the above catalyst selected from the group consisting of an alkali metal compound and/or an alkaline earth metal compound.

The stabilizer is added to and kneaded with a molten aromatic polycarbonate directly or in the form of a solution or dispersion in an appropriate solvent. The apparatus used to carry out this operation is not limited to a particular type but a double-screw extruder or the like is preferred. When the stabilizer is dissolved or dispersed in a solvent, a vented double-screw extruder is particularly preferably used.

Additives may be added to the aromatic polycarbonate in limits not prejudicial to the object of the present invention. These additives are preferably added to the molten aromatic polycarbonate like the stabilizer. The additives include a heat resistant stabilizer, epoxy compound, ultraviolet light absorber, release agent, colorant, slipping agent, antiblocking agent, lubricant, organic filler and inorganic filler.

Out of these, a heat resistant stabilizer, ultraviolet light absorber, release agent, colorant and the like are generally used and may be used in combination of two or more.

Examples of the heat resistant stabilizer used in the present invention include phosphorus compounds, phenol-based stabilizers, organic thioether-based stabilizers and hindered amine-based stabilizers.

General ultraviolet light absorbers are used as the ultraviolet light absorber, as exemplified by salicylic acid-based, benzophenone-based, benzotriazole-based and cyanoacrylate-based ultraviolet light absorbers.

Generally known release agents may be used as the release agent, as exemplified by hydrocarbon-based release agents such as a paraffin, fatty acid-based release agents such as stearic acid, fatty acid amide-based release agents such as stearamide, alcohol-based release agents such as stearyl alcohol and pentaerythritol, fatty acid ester-based release agents such as glycerol monostearate, and silicone-based release agents such as silicone oil.

Organic and inorganic pigments and dyes may be used as the colorant.

Although the method of adding these additives is not particularly limited, they may be added to the aromatic polycarbonate directly or a master pellet made therefrom may be added.

EXAMPLES

The following examples and comparative examples are provided for the purpose of further illustrating the present invention but are in no way to be taken as limiting. "%" and "parts" in the examples and comparative examples mean "% by weight" and "partsbyweight", respectively, unless otherwise stated.

The physical properties of the obtained aromatic polycarbonates (may be abbreviated as "PC" hereinafter including tables) in the examples were measured as follows. (viscosity average molecular weight)

The intrinsic viscosity of a methylene chloride solution of an aromatic polycarbonate was measured with an Ubbellohde viscometer at 20° C. to obtain a viscosity average molecular weight Mv from the following equation.

$$[\eta]=1.23\times10^{-4}\times Mv^{0.83}$$

(color ("b" value))

The color of an aromatic polycarbonate pellet (2.5 (short diameter)×3.3 (long diameter)×3.0 (length) mm) was measured with the ND-1001DP color difference meter of Nippon Denshoku Kogyo Co., Ltd. in accordance with the reflection method and the "b" value was used as an index of yellowness.

Example 1

The inside of a production system consisting of two SUS316 vertical polymerizers (first tank and second tank) having a jacket and equipped with a fractionating column and one SUS316 horizontal single-screw polymerizer (third tank: reactor capacity of 1,000 liters) having a jacket for circulating a heating medium, all of which were connected in series through gear pumps, was cleaned.

300 liters of diphenyl carbonate was injected into the first polymerizer while a 280° C. heating medium was circulated into the jacket and kept for 3 hours, transferred to the second polymerizer to clean the polymerizer under a nitrogen atmosphere at 280° C. for 3 hours, and then transferred to the third polymerizer to clean the polymerizer under a nitrogen atmosphere at 280° C. for 3 hours. Then, the diphenylcarbonate was wholly extracted. Thereafter, this operation was further repeated one more time.

The polymerizers were dried under a reduced pressure of 50 Torr for 8 hours to remove the residual diphenyl carbonate. 2,2-bis(4-hydroxyphenyl)propane (may be abbreviated as BPA hereinafter) and diphenyl carbonate were charged into a raw material melting tank equipped with a stirrer in a molar ratio of 1:1.02, the inside of the tank was substituted by nitrogen, the raw materials were molten by heating at 150° C., and the molten mixed solution was transferred to a raw material storage tank maintained at 150° C.

Thereafter, the above molten mixed solution was continuously supplied into the first tank equipped with a fractionating column whose inside temperature and pressure were maintained at 220° C. and 13,333 Pa (100 mmHg), respectively, $5\times10^{-7}$ equivalent of sodium phenoxide (to be abbreviated as NPO hereinafter) as a metal and $1\times10^{-4}$ equivalent of tetramethylammonium hydroxide (TMAH) as basic nitrogen were continuously added based on 1 mol of 2,2-bis(4-hydroxyphenyl)propane, a reaction was carried out while the formed phenol was removed from the fractionating column, and the obtained reaction product was continuously extracted by using the gear pump.

Subsequently, the reaction mixture was continuously supplied into the second tank whose inside temperature and pressure were maintained at 250° C. and 1,333 Pa (10 mmHg), respectively, a reaction was carried out while the formed phenol was removed from the fractionating column, and the obtained reaction mixture was continuously extracted by using the gear pump.

The reaction mixture was then continuously supplied into the horizontal single-screw polymerizer whose inside temperature and pressure were maintained at 270° C. and 200 Pa±70 Pa (1.5 mmHg±0.5 mmHg), respectively, polymerization was further carried out while the formed phenol was removed to the outside of the system to continuously produce an aromatic polycarbonate, and the molten aromatic polycarbonate was extracted by using the gear pump, extruded from a die and pelletized by a pelletizer. The aromatic polycarbonate was sampled 8 hours and 48 hours after it began to be extracted by the gear pump attached to the horizontal single-screw polymerizer to measure the color of the aromatic polycarbonate. The results are shown in Table 1.

Example 4

A polycarbonate was obtained after cleaning was carried out in the same manner as in Example 1 except that after cleaning with diphenyl carbonate was carried out in the same manner as in Example 1, cleaning with phenol was carried out by circulating a 180° C. heating medium into the jacket of each polymerizer. The results are shown in Table 1.

Comparative Example 2

A polycarbonate was obtained after cleaning was carried out in the same manner as in Example 1 except that cleaning with phenol alone was carried out by circulating a 180° C. heating medium into the jacket of each polymerizer. The results are shown in Table 1.

Comparative Example 4

A polycarbonate was obtained after cleaning was carried out in the same manner as in Example 1 except that cleaning with ethylene glycol alone was carried out by circulating a 180° C. heating medium into the jacket of each polymerizer. The results are shown in Table 1.

Comparative Example 5

A polycarbonate was obtained after cleaning was carried out in the same manner as in Example 1 except that cleaning with triethylene glycol alone was carried out by circulating a 280° C. heating medium into the jacket of each polymerizer. The results are shown in Table 1.

Comparative Example 6

A polycarbonate was obtained in the same manner as in Example 1 except that the liquid contacting portion of an autoclave made of SUS316 was polished with a #350 buff in place of the cleaning in Example 1, and other cleaning operation was not carried out. The results are shown in Table 1.

Comparative Example 7

A polycarbonate was obtained in the same manner as in Example 1 except that production was suspended, the production unit was filled with nitrogen gas, the unit was emptied, heating was stopped, the unit was left for a whole day in place of cleaning in Example 1, and cleaning was not carried out. The results are shown in Table 1.
(Production System)

In the following Examples 5 to 15, a production system consisting of a raw material melting tank equipped with a stirrer, two vertical polymerizers (first tank and second tank) having a jacket, made of SUS316 and equipped with a fractionating column and a stirrer, and a horizontal single-screw polymerizer (third tank: reactor having a capacity of 1,000 liters) having a jacket for circulating a heating medium and made of SUS316 was used. The liquid contacting portions of these polymerizers were made of SUS316.

Example 5

The operation of the above production system was suspended, and shut-down operation and cleaning operation were carried out. A production system consisting of two vertical polymerizers (first tank and second tank) having a jacket, made of SUS316 and equipped with a fractionating column and a horizontal single-screw polymerizer (third tank: reactor having a capacity of 1,000 liters) having a jacket for circulating a heating medium and made of SUS316 all of which were connected in series through gear pumps was used to continuously produce a polycarbonate having a viscosity average molecular weight of 15,000. To empty the system and disassemble and repair essential parts, the following shut-down procedure was made to suspend production and then the inside of the system was cleaned.

The supply of raw materials (bisphenol A and diphenyl carbonate) into the first tank was stopped, and the reaction solution in the two vertical polymerizers (first tank and second tank) was supplied into the reactor of the subsequent step until these reactors became empty. Even after the reaction solution in the second tank was supplied into the third tank, an aromatic polycarbonate having a viscosity average molecular weight of 15,000 was continuously discharged. After the aromatic polycarbonate was discharged until the amount of the aromatic polycarbonate remaining in the system became 100 liters, an inert gas was introduced into the reactors to terminate an ester exchange reaction. 10 liters of diphenyl carbonate was continuously injected into the third tank as the carbonate group-containing compound under agitation while a 280° C. heating medium was circulated into the jacket of the third tank and kept for 1 hour to depolymerize the reaction product so as to reduce its molecular weight. After 1 hour, 60 liters of an aromatic polycarbonate having a reduced viscosity average molecular weight of 4,000 was extracted to reduce the amount of the residue in the third tank to 50 liters. Thereafter, 300 liters of diphenyl carbonate was injected into the third tank as the carbonic acid diester to clean the tank at 280° C. for 3 hours in a nitrogen atmosphere, and all the solution was removed. Then, this operation was repeated one more time.

The first and second tanks which were empty were cleaned with 300 liters of diphenyl carbonate at the same temperature for the same time as the third tank twice under agitation.

These tanks were vacuum dried at a pressure of 50 Torr for 8 hours to remove the residual diphenyl carbonate, the temperature of the heating medium was reduced to normal temperature, and the gear pump of the third tank was detached and disassembled to be cleaned. After the end of servicing and one-day suspension, the gear pump was attached, the heating medium was heated, and production was resumed without carrying out cleaning operation on the production system in this stage. 2,2-bis(4-hydroxyphenyl) propane (to be abbreviated as BPA hereinafter) and diphenyl carbonate were charged into a raw material melting tank equipped with a stirrer in a molar ratio of 1:1.02, the inside of the tank was substituted with nitrogen, the raw materials were molten at 150° C., and the resulting molten mixed solution was transferred to a raw material storage tank maintained at 150° C.

Thereafter, the above molten mixed solution was continuously supplied into the first tank equipped with a fractionating column whose inside temperature and pressure were maintained at 220° C. and 13,333 Pa (100 mmHg), respectively, $5 \times 10^{-7}$ equivalent of NPO as a metal and $1 \times 10^{-4}$ equivalent of TMAH as basic nitrogen were continuously added based on 1 mol of 2,2-bis(4-hydroxyphenyl) propane, a reaction was carried out while the formed phenol was removed from the fractionating column, and the obtained reaction product was continuously extracted by the gear pump.

Subsequently, the reaction mixture was continuously supplied into the second tank whose inside temperature and pressure were maintained at 250° C. and 1,333 Pa (10 mmHg), respectively, a reaction was carried out while the formed phenol was removed from the fractionating column, and the obtained reaction mixture was continuously extracted by the gear pump.

The reaction mixture was then continuously supplied into the horizontal single-screw polymerizer whose inside temperature and pressure were maintained at 270° C. and 200 Pa±70 Pa (1.5 mmHg±0.5 mmHg), respectively, polymerization was further carried out while the formed phenol was removed to the outside of the system to continuously produce an aromatic polycarbonate, and the molten aromatic polycarbonate was extracted by the gear pump, extruded from a die and pelletized by a pelletizer. The aromatic polycarbonate was sampled 8 hours and 48 hours after it began to be extracted by the gear pump attached to the horizontal single-screw polymerizer so as to measure its color. The results are shown in Table 1.

Example 6

5 liters of diphenyl carbonate was injected into the third tank as the carbonate group-containing compound under agitation and kept for 1 hour to depolymerize the reaction product to reduce its molecular weight. After 1 hour, the procedure of Example 5 was repeated except that 55 liters of an aromatic polycarbonate having a reduced viscosity average molecular weight of 6,000 was extracted to reduce the amount of the residue in the third tank to 50 liters, and then production was resumed without carrying out cleaning operation on the production system to obtain an aromatic polycarbonate. The results are shown in Table 1.

Example 7

The operation of the system used in Example 5 was suspended and shut-down operation was carried out. 10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 300 liters of diphenyl carbonate was injected into the third tank as the carbonic acid diester to clean the third tank at 280° C. for 3 hours in a nitrogen atmosphere, and all the solution was removed. Then, this operation was repeated one more time.

Stirring of the third tank was stopped, and the temperature of the heating medium circulating in the jacket of this reactor was gradually lowered to 180° C. Thereafter, 300 liters of phenol was injected into the third tank as the aromatic monohydroxy compound to clean the tank at 180° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate twice and with 300 liters of phenol twice at the same temperature for the same time as the third tank under agitation, production was resumed without carrying out cleaning operation on the production system to obtain an aromatic polycarbonate. The results are shown in Table 1.

Example 8

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 100 liters of diphenyl carbonate was injected into the third tank as the carbonic acid diester to clean the tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 100 liters of diphenyl carbonate at the same temperature for the same time as the third tank twice under agitation, production was resumed without carrying out cleaning operation on the production system to obtain an aromatic polycarbonate. The results are shown in Table 1.

Example 9

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 50 liters of diphenyl carbonate was injected into the third tank as the aromatic carbonic acid diester to clean the tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 50 liters of diphenyl carbonate at the same temperature for the same time as the third tank twice under agitation, production was resumed without carrying out cleaning operation on the production system to obtain an aromatic polycarbonate. The results are shown in Table 1.

Example 10

The procedure of Example 5 was repeated except that drying was not carried out after the reduction of molecular weight and cleaning with diphenyl carbonate were carried out in the same manner as in Example 5. Then, production was resumed without carrying out cleaning operation on the production system to obtain an aromatic polycarbonate. The results are shown in Table 1.

Example 11

10 liters of diphenyl carbonate was injected into the third tank as the carbonate group-containing compound under agitation and kept for 1 hour to depolymerize the reaction product to reduce its molecular weight. After 1 hour, 300 liters of diphenyl carbonate was injected into the third tank as the carbonic acid diester without extracting an aromatic polycarbonate having a reduced viscosity average molecular weight of 4,000 to clean the tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Example 12

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 300 liters of diphenyl carbonate was injected into the third tank as the carbonic acid diester to clean the third tank at 320° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Example 13

10 liters of a polycarbonate oligomer having a viscosity average molecular weight of 6,000 was injected into the third tank as the carbonate group-containing compound under agitation and kept for 1 hour to depolymerize the reaction product to reduce its molecular weight. After 1 hour, 60 liters of a polycarbonate having a reduced viscosity average molecular weight of 7,500 was extracted to reduce the amount of the residue in the third tank to 50 liters. 300 liters of diphenyl carbonate was injected into the third tank as the carbonic acid diester to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Example 14

10 liters of o-methylphenyl-phenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 300 liters of o-methylphenyl-phenyl carbonate was injected into the third tank as the carbonic acid diester to clean the third tank at 280° C. for 3 hours in a nitrogen atmosphere, and all the solution was removed. Then, this operation was repeated one more time. After the procedure of Example 5 was repeated except this, production was resumed without carrying out cleaning operation on the production system to obtain an aromatic polycarbonate. The results are shown in Table 1.

Example 15

10 liters of o-chlorophenyl-phenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. 300 liters of o-chlorophenyl-phenyl carbonate was injected into the third tank as the carbonic acid diester to clean the third tank at 280° C. for 3 hours in a nitrogen atmosphere, and all the solution was removed. Then, this operation was repeated one more time. After the procedure of Example 5 was repeated except this, production was resumed without carrying out cleaning operation on the production system to obtain an aromatic polycarbonate. The results are shown in Table 1.

Comparative Example 8

10 liters of triethylene glycol was injected into the third tank as the carbonate group-containing compound under agitation and kept for 1 hour to depolymerize the reaction product to reduce its molecular weight. After 1 hour, 60 liters of a viscous substance having a reduced viscosity average molecular weight of 3,000 was extracted to reduce the amount of the residue in the third tank to 50 liters. 300 liters of diphenyl carbonate was injected into the third tank as the carbonic acid diester to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 9

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Thereafter, not a carbonic acid diester but 300 liters of triethylene glycol was injected into the third tank to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of triethylene glycol at the same temperature for the same time as the third tank twice under agitation, production was resumed without carrying out cleaning operation on the production system to obtain an aromatic polycarbonate. The results are shown in Table 1.

Comparative Example 10

After the amount of a polycarbonate having a viscosity average molecular weight of 15,000 remaining in the third tank was adjusted to 100 liters without injecting the carbonate group-containing compound, 300 liters of diphenyl carbonate was injected into the third tank as the carbonic acid diester to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 11

10 liters of diphenyl carbonate was injected into the third tank as the carbonate group-containing compound under agitation and kept for 1 hour to depolymerize the reaction product to reduce its molecular weight. After 1 hour, 60 liters of a polycarbonate having a reduced viscosity average molecular weight of 4,000 was extracted to reduce the amount of the residue in the third tank to 50 liters. Cleaning with the carbonic acid diester or the like was not carried out.

Without carrying out cleaning of the first tank and the second tank which were empty like the third tank, production was resumed to obtain an aromatic polycarbonate. The results are shown in Table 1.

Comparative Example 12

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Without carrying out cleaning with the carbonic acid diester, stirring of the third tank was suspended, and the temperature of a heating medium circulating in the jacket of the reactor was gradually lowered to 180° C. 300 liters of phenol was injected into the third tank as the aromatic monohydroxy compound to clean the third tank at 180° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of phenol at the same temperature for the same time as the third tank twice under agitation, production was resumed without carrying out cleaning operation on the production system to obtain an aromatic polycarbonate. The results are shown in Table 1.

Comparative Example 13

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Stirring of the third tank was suspended, and the temperature of a heating medium circulating in the jacket of the reactor was gradually lowered to 180° C. Thereafter, 300 liters of diphenyl carbonate was injected into the third tank as the aromatic carbonic acid diester to clean the third tank at 180° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 14

1 liter of diphenyl carbonate was injected into the third tank as the carbonate group-containing compound under agitation and kept for 1 hour to depolymerize the reaction product to reduce its molecular weight. After 1 hour, 51 liters of an aromatic polycarbonate having a reduced viscosity average molecular weight of 9,000 was extracted to reduce the amount of the residue in the third tank to 50 liters. Thereafter, 300 liters of diphenyl carbonate was injected into the third tank as the carbonic acid diester to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 15

10 liters of diphenyl carbonate was injected into the third tank as the carbonate group-containing compound under agitation and kept for 1 hour to depolymerize the reaction product to reduce its molecular weight. After 0.1 hour, 60 liters of an aromatic polycarbonate having a reduced viscosity average molecular weight of 10,000 was extracted to reduce the amount of the residue in the third tank to 50 liters. Thereafter, 300 liters of diphenyl carbonate was injected into the third tank as the carbonic acid diester to clean the third tank at 280° C. for 3 hours in a nitrogen atmosphere, and all the solution was removed. Then, this operation was repeated one more time.

After the first tank and the second tank which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 16

The supply of raw materials (bisphenol A and diphenyl carbonate) into the first tank was stopped, the reaction solution in the two vertical polymerizers (first tank and second tank) was supplied into the subsequent reactors at a downstream until the reactors became empty. Even after the reaction solution in the second tank was supplied into the third tank, an aromatic polycarbonate having a viscosity average molecular weight of 15,000 was continuously discharged. After the aromatic polycarbonate was discharged until the amount of the aromatic polycarbonate remaining in the system became 100 liters, an inert gas was introduced into the reaction system to terminate an ester exchange reaction. 10 liters of phenol was continuously injected into the third tank under agitation while a 250° C. heating medium was circulated in the jacket of the third tank and kept for 1 hour to depolymerize the reaction product to reduce its molecular weight. This molecular weight reduction operation was carried out under increased pressure because the boiling point of phenol at normal pressure was about 180° C. After 1 hour, 60 liters of an aromatic polycarbonate having a reduced viscosity average molecular weight of 12,000 was extracted to reduce the amount of the residue in the third tank to 50 liters. Thereafter, 300 liters of diphenyl carbonate was injected into the third tank as the carbonic acid diester to clean the tank at 250° C. for 3 hours in a nitrogen atmosphere, and all the solution was removed. Then, this operation was repeated one more time.

After the first and second tanks which were empty were treated in the same manner as in Example 5 except that they were cleaned with 300 liters of diphenyl carbonate at the same temperature for the same time as the third tank twice under agitation, production was resumed without carrying out cleaning operation on the production system to obtain an aromatic polycarbonate. The results are shown in Table 1.

Comparative Example 17

The supply of raw materials (bisphenol A and diphenyl carbonate) into the first tank was stopped, the reaction solution in the two vertical polymerizers (first tank and second tank) was supplied into the subsequent reactors at a downstream until the reactors became empty. Even after the reaction solution in the second tank was supplied into the third tank, an aromatic polycarbonate having a viscosity average molecular weight of 15,000 was continuously discharged. After the aromatic polycarbonate was discharged until the amount of the aromatic polycarbonate remaining in the system became 100 liters, an inert gas was introduced into the reaction system to terminate an ester exchange reaction. 10 liters of phenol was continuously injected into the third tank under agitation while a 250° C. heating medium was circulated in the jacket of the third tank and kept for 1 hour to depolymerize the reaction product to reduce its molecular weight. This molecular weight reduction operation was carried out under increased pressure because the boiling point of phenol at normal pressure was about 180° C. After 1 hour, 60 liters of an aromatic polycarbonate having a reduced viscosity average molecular weight of 12,000 was extracted to reduce the amount of the residue in the third tank to 50 liters. Thereafter, 300 liters of diphenyl carbonate was injected into the third tank as the carbonic acid diester to clean the tank at 250° C. for 3 hours in a nitrogen atmosphere, and all the solution was removed. Then, this operation was repeated one more time. Stirring of the third tank was stopped, the temperature of the heating medium circulating in the jacket of the reactor was gradually lowered to 180° C. Thereafter, 300 liters of phenol was injected into the third tank as the aromatic monohydroxy compound to clean the tank at 180° C. for 3 hours in a nitrogen atmosphere, and all the solution was removed. This operation was repeated one more time.

After the first and second tanks which were empty were treated in the same manner as in Example 5 except that they were cleaned with 300 liters of diphenyl carbonate twice and with 300 liters of phenol twice at the same temperature for the same time as the third tank under agitation, production was resumed without carrying out cleaning operation on the production system to obtain an aromatic polycarbonate. The results are shown in Table 1.

Comparative Example 18

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Thereafter, not a carbonic acid diester but 300 liters of benzaldehyde was injected into the third tank to clean the third tank at 220° C. for 3 hours in a nitrogen atmosphere, and all the solution was removed. This operation was repeated one more time. This cleaning operation was carried out under increased pressure because the boiling point of benzaldehyde at normal pressure was about 180° C.

After the first tank and the second tank which were empty were treated in the same manner as in Example 5 except that they were cleaned with 300 liters of benzaldehyde at the same temperature for the same time as the third tank twice under agitation, production was resumed without carrying out cleaning operation on the production system to obtain an aromatic polycarbonate. The results are shown in Table 1.

Comparative Example 19

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Thereafter, not a carbonic acid diester but 300 liters of benzaldehyde was injected into the third tank to clean the third tank at 170° C. for 3 hours in a nitrogen atmosphere, and all the solution was removed. This operation was repeated one more time. After the first tank and the second tank which were empty were treated in the same manner as in Example 5 except that they were cleaned with 300 liters of benzaldehyde at the same temperature for the same time as the third tank twice under agitation, production was resumed without carrying out cleaning operation on the production system to obtain an aromatic polycarbonate. The results are shown in Table 1.

Comparative Example 20

10 liters of diphenyl carbonate was injected into the third tank as the carbonate group-containing compound under agitation and kept for 1 hour to depolymerize the reaction product to reduce its molecular weight. After 1 hour, 60 liters of an aromatic polycarbonate having a reduced viscosity average molecular weight of 4,000 was extracted to reduce the amount of the residue in the third tank to 50 liters. Thereafter, not a carbonic acid diester but 300 liters of benzoic acid was injected into the third tank to clean the third tank at 240° C. for 3 hours in a nitrogen atmosphere, and all the solution was removed. This operation was repeated one more time. After the first tank and the second tank which were empty were treated in the same manner as in Example 5 except that they were cleaned with 300 liters of benzoic acid at the same temperature for the same time as the third tank twice under agitation, production was resumed without carrying out cleaning operation on the production system to obtain an aromatic polycarbonate. The results are shown in Table 1.

TABLE 1

| | | Ex.1 | Ex.4 | Ex.5 | Ex.6 | Ex.7 | Ex.8 | Ex.9 | Ex.10 | Ex.11 | Ex.12 | Ex.13 | Ex.14 | Ex.15 |
|---|---|---|---|---|---|---|---|---|---|---|---|---|---|---|
| reduction of viscosity average molecular weight | | | | | | | | | | | | | | |
| molecular weight of produced PC | Mv | | | 15000 | 15000 | 15000 | 15000 | 15000 | 15000 | 15000 | 15000 | 15000 | 15000 | 15000 |
| total amount of PC in reactors | L | | | 100 | 100 | 100 | 100 | 100 | 100 | 100 | 100 | 100 | 100 | 100 |
| carbonate group-containing compound | | | | DPC | DPC | DPC | DPC | DPC | DPC | DPC | DPC | * | *1)Me-DPC | *2)Cl-DPC |
| amount of injection | L | | | 10 | 5 | 10 | 10 | 10 | 10 | 10 | 10 | 10 | 10 | 10 |
| temperature | °C | | | 280 | 280 | 280 | 280 | 280 | 280 | 280 | 280 | 280 | 280 | 280 |
| time | h | | | 1 | 1 | 1 | 1 | 1 | 1 | 1 | 1 | 1 | 1 | 1 |
| amount of the residue after discharge | L | | | 50 | 50 | 50 | 50 | 50 | 50 | 110 | 50 | 50 | 50 | 50 |
| molecular weight of discharged PC | Mv | | | 4000 | 6000 | 4000 | 4000 | 4000 | 4000 | 4000 | 4000 | 7500 | 4000 | 4000 |
| cleaning with carbonic acid diester | | | | | | | | | | | | | | |
| carbonic acid diester used for cleaning | | DPC | DPC | DPC | DPC | DPC | DPC | DPC | DPC | DPC | DPC | DPC | *1)Me-DPC | *2)Cl-DPC |
| amount of injection | L | 300 | 300 | 300 | 300 | 300 | 50 | 50 | 300 | 300 | 300 | 300 | 300 | 300 |
| temperature | °C | 280 | 280 | 280 | 280 | 280 | 280 | 280 | 280 | 280 | 320 | 280 | 280 | 280 |
| time | h | 3 | 3 | 3 | 3 | 3 | 3 | 3 | 3 | 3 | 3 | 3 | 3 | 3 |
| number of times of cleaning | | 2 | 2 | 2 | 2 | 2 | 2 | 2 | 2 | 2 | 2 | 2 | 2 | 2 |

| | | C.Ex.8 | C.Ex.9 | C.Ex.10 | C.Ex.11 | C.Ex.12 | C.Ex.13 | C.Ex.14 | C.Ex.15 | C.Ex.16 | C.Ex.17 | C.Ex.18 | C.Ex.19 | C.Ex.20 |
|---|---|---|---|---|---|---|---|---|---|---|---|---|---|---|
| reduction of viscosity average molecular weight | | | | | | | | | | | | | | |
| molecular weight of produced PC | Mv | 15000 | 15000 | 15000 | 15000 | 15000 | 15000 | 15000 | 15000 | 15000 | 15000 | 15000 | 15000 | 15000 |
| total amount of PC in reactors | L | 100 | 100 | 100 | 100 | 100 | 100 | 100 | 100 | 100 | 100 | 100 | 100 | 100 |
| carbonate group-containing compound | | TEG | DPC | none | DPC | DPC | DPC | DPC | DPC | PhOH | DPC | DPC | DPC | DPC |
| amount of injection | L | 10 | 10 | | 10 | 10 | 10 | 1 | 10 | 10 | 10 | 10 | 10 | 10 |
| temperature | °C | 280 | 280 | 280 | 280 | 280 | 280 | 280 | 280 | 250 | 250 | 280 | 280 | 280 |
| time | h | 1 | 1 | 1 | 1 | 1 | 1 | 1 | 0.1 | 1 | 1 | 1 | 1 | 1 |
| amount of the residue after discharge | L | 50 | 50 | 100 | 50 | 50 | 50 | 50 | 50 | 50 | 50 | 50 | 50 | 50 |
| molecular weight of discharged PC | Mv | 3000 | 4000 | 15000 | 4000 | 4000 | 4000 | 9000 | 10000 | 12000 | 12000 | 4000 | 4000 | 4000 |
| cleaning with carbonic acid diester | | | | | | | | | | | | | | |
| carbonic acid diester used for cleaning | | DPC | TEG | DPC | none | none | DPC | DPC | DPC | DPC | DPC | *3)PhCHO | *3)PhCHO | *4)PhCOOH |
| amount of injection | L | 300 | 300 | 300 | | | 300 | 300 | 300 | 300 | 300 | 300 | 300 | 300 |
| temperature | °C | 280 | 280 | 280 | | | 180 | 280 | 280 | 250 | 250 | 220 | 170 | 240 |
| time | h | 3 | 3 | 3 | | | 3 | 3 | 3 | 3 | 3 | 3 | 3 | 3 |
| number of times of cleaning | | 2 | 2 | 2 | | | 2 | 2 | 2 | 2 | 2 | 2 | 2 | 2 |

| | | Ex.1 | Ex.4 | Ex.7 | Ex.12 | Ex.13 | Ex.14 | Ex.15 |
|---|---|---|---|---|---|---|---|---|
| cleaning with aromatic monohydroxy compound | | | | | | | | |
| cleaning agent | | PhOH | PhOH | PhOH | | | | |
| amount of injection | L | 300 | 300 | 300 | | | | |
| temperature | °C | 180 | 180 | 180 | | | | |
| time | h | 3 | 3 | 3 | | | | |
| number of times of cleaning | | 2 | 2 | 2 | | | | |

TABLE 1-continued

| | | C.Ex.2 | C.Ex.4 | C.Ex.5 | C.Ex.8 | C.Ex.9 | C.Ex.10 | C.Ex.11 | C.Ex.12 | C.Ex.13 | C.Ex.14 | C.Ex.15 | C.Ex.16 | C.Ex.17 | C.Ex.18 | C.Ex.19 | C.Ex.20 |
|---|---|---|---|---|---|---|---|---|---|---|---|---|---|---|---|---|---|
| drying step | | | | | | | | | | | | | | | | | |
| drying pressure resumption | torr | 50 | 50 | 50 | 50 | 50 | 50 | 50 | 50 | 50 not drying | 50 | 50 | 50 | 50 | 50 | 50 | 50 |
| after 8 hours | col. b value | −0.4 | −0.5 | −0.5 | −0.5 | −0.5 | −0.5 | −0.5 | −0.5 | −0.3 | −0.3 | −0.3 | −0.2 | −0.5 | −0.5 | −0.5 | −0.3 |
| | molecular weight | 15200 | 15200 | 15000 | 15000 | 15000 | 15000 | 15000 | 15000 | 15000 | 15000 | 15000 | 15000 | 15000 | 15000 | 15000 | 15000 |
| after 48 hours | col. b value | −0.5 | −0.6 | −0.5 | −0.5 | −0.5 | −0.5 | −0.5 | −0.5 | −0.5 | −0.5 | −0.5 | −0.5 | −0.5 | −0.5 | −0.5 | −0.5 |
| | molecular weight | 15200 | 15200 | 15000 | 15000 | 15000 | 15000 | 15000 | 15000 | 15000 | 15000 | 15000 | 15000 | 15000 | 15000 | 15000 | 15000 |
| cleaning with aromatic monohydroxy compound | | | | | | | | | | | | | | | | | |
| cleaning agent | | PhOH | EG | TEG | | | | | PhOH | | | | | PhOH | | | |
| amount of injection | L | 300 | 300 | 300 | | | | | 300 | | | | | 300 | | | |
| temperature | °C. | 180 | 180 | 280 | | | | | 180 | | | | | 180 | | | |
| time | h | 3 | 3 | 3 | | | | | 3 | | | | | 3 | | | |
| number of times of cleaning | | 2 | 2 | 2 | | | | | 2 | | | | | 2 | | | |
| drying step | | | | | | | | | | | | | | | | | |
| drying pressure resumption | torr | 50 | 50 | 50 | 50 | 50 | 50 | 50 | 50 | 50 | 50 | 50 | 50 | 50 | 50 | 50 | 50 |
| after 8 hours | col. b value | 3.3 | 3.8 | 3.5 | 2.5 | 2 | 2.5 | 1.2 | 1.2 | 0.8 | 0.8 | 0.5 | 1.2 | 1 | 6 | 4 | 4.5 |
| | molecular weight | 9000 | 10800 | 9900 | 8000 | 9000 | 9000 | 14500 | 14500 | 15000 | 15000 | 15000 | 14000 | 14300 | 4500 | 6000 | 7000 |
| after 48 hours | col. b value | 2.3 | 2.6 | 2.2 | 1 | 0.8 | 1.5 | 0.4 | 0.4 | 0.2 | 0.2 | 0 | 0.6 | 0.3 | 5.5 | 2.5 | 3.5 |
| | molecular weight | 12000 | 13000 | 13600 | 14000 | 15000 | 13500 | 15000 | 15000 | 15000 | 15000 | 15000 | 15000 | 15000 | 8500 | 10000 | 11000 |

Ex.: Example
*oligocarbonate having a viscosity average molecular weight of 6,000
*[1]O—MePh—COOO—Ph
*[2]Cl—Ph—COOO—Ph
C.Ex.: Comparative Example
*[3]benzaldehyde
*[4]benzoic acid

What is claimed is:

1. A method of cleaning an aromatic polycarbonate production unit, comprising cleaning the aromatic polycarbonate production unit with a carbonic acid diaryl ester at a temperature of 200 to 350° C. in an inert gas atmosphere.

2. The method of claim 1, wherein the production unit has a buffed inner wall.

3. The method of claim 1, wherein the liquid contacting portion of the production unit is made of stainless steel.

4. The method of claim 1, wherein the carbonic acid diaryl ester is diphenyl carbonate.

5. The method of claim 1, wherein the cleaning temperature is in the range of 200 to 330° C.

6. The method of claim 1, wherein the inert gas is nitrogen.

7. The method of claim 1, wherein the carbonic acid diaryl ester is used in an amount of 10% to 90% of the effective inner volume of the production unit.

8. The method of claim 1, wherein the cleaning agent is discharged and the production unit is vacuum dried after cleaning with a carbonic acid diaryl ester.

9. The method of claim 1, wherein the cleaning agent is discharged and the production unit is cleaned with an aromatic monohydroxy compound after cleaning with a carbonic acid diaryl ester.

10. The method of claim 9, wherein the production unit is vacuum dried after the aromatic monohydroxy compound cleaning agent is discharged.

11. The method of claim 9, wherein the aromatic monohydroxy compound is used in an amount of 10% or more of the effective inner volume of the production unit and less than the amount of a retained aromatic polycarbonate at the time of producing an aromatic polycarbonate.

12. A method of cleaning an aromatic polycarbonate production unit, comprising:

(1) depolymerizing an aromatic polycarbonate remaining in the production unit with a carbonate group-containing compound in the production unit to form a depolymerized product having a viscosity average molecular weight of 8,000 or less;

(2) discharging the depolymerized product from the production unit;

(3) introducing a carbonic acid diaryl ester into the production unit; and (4) cleaning the inside of the production unit with the carbonic acid diaryl ester at a temperature of 200 to 350° C. in an inert gas atmosphere.

13. The method of claim 12, wherein the carbonate group-containing compound used in the step (1) is identical to a carbonic acid diester used for the production of an aromatic polycarbonate remaining in the production unit or to an aromatic oligocarbonate having a viscosity average molecular weight of 8,000 or less which is formed in the course of the production of an aromatic polycarbonate.

14. The method of claim 12, wherein the liquid contacting portion of the production unit is made of stainless steel.

15. The method of claim 12, wherein the carbonic acid diaryl ester in the step (3) is diphenyl carbonate.

16. The method of claim 12, wherein the cleaning temperature in the step (4) is in the range of 200 to 330° C.

17. The method of claim 12, wherein the inert gas in the step (4) is nitrogen.

18. The method of claim 12, wherein the carbonic acid diaryl ester in the step (4) is used in an amount of 10% to 90% of the effective inner volume of the production unit.

19. The method of claim 12, wherein the cleaning agent is discharged and the production unit is vacuum dried after cleaning with a carbonic acid diaryl ester in the step (4).

20. The method of claim 12, wherein the cleaning agent is discharged and the production unit is cleaned with an aromatic monohydroxy compound after cleaning with a carbonic acid diaryl ester in the step (4).

21. The method of claim 20, wherein the production unit is vacuum dried after the aromatic monohydroxy compound cleaning agent is discharged.

22. The method of claim 20, wherein the aromatic monohydroxy compound is used in an amount of 10% to 90% of the effective inner volume of the production unit.

23. An aromatic polycarbonate production process comprising carrying out an ester exchange reaction between an aromatic dihydroxy compound and a carbonic acid diester in the presence of a catalyst consisting of a combination of a nitrogen-containing basic compound and at least one compound selected from an alkali metal compound and an alkaline earth metal compound in a production unit cleaned by the method of claim 1.

24. An aromatic polycarbonate production process comprising carrying out an ester exchange reaction between an aromatic dihydroxy compound and a carbonic acid diester in the presence of a catalyst consisting of a combination of a nitrogen-containing basic compound and at least one compound selected from an alkali metal compound and an alkaline earth metal compound in a production unit cleaned by the method of claim 12.

* * * * *